(12) United States Patent
Kondou

(10) Patent No.: US 8,963,409 B2
(45) Date of Patent: Feb. 24, 2015

(54) DISCHARGE ELEMENT AND METHOD OF MANUFACTURING THE SAME

(75) Inventor: Zenichi Kondou, Fukushima (JP)

(73) Assignee: Kondo Electric Co., Ltd., Fukushima (JP)

(*) Notice: Subject to any disclaimer, the term of this patent is extended or adjusted under 35 U.S.C. 154(b) by 63 days.

(21) Appl. No.: 13/824,067

(22) PCT Filed: Feb. 2, 2011

(86) PCT No.: PCT/JP2011/052171
§ 371 (c)(1),
(2), (4) Date: Mar. 15, 2013

(87) PCT Pub. No.: WO2012/105014
PCT Pub. Date: Aug. 9, 2012

(65) Prior Publication Data
US 2013/0181598 A1 Jul. 18, 2013

(51) Int. Cl.
*H01T 4/04* (2006.01)
*H01T 4/12* (2006.01)
*H01T 1/00* (2006.01)
*B23H 1/04* (2006.01)

(52) U.S. Cl.
CPC .. *H01T 1/00* (2013.01); *H01T 4/04* (2013.01); *H01T 4/12* (2013.01); *B23H 1/04* (2013.01)
USPC ............. 313/231.11; 313/231.21; 361/120; 361/118

(58) Field of Classification Search
CPC .... H01T 4/00–4/20; H02H 9/042; H02H 9/06
USPC ................ 313/231.11, 231.21, 231.71; 361/117–138
See application file for complete search history.

(56) References Cited

U.S. PATENT DOCUMENTS 4,031,347 A * 6/1977 Isikawa et al. ............... 361/120
4,063,127 A * 12/1977 Le Cain et al. .......... 313/231.11
(Continued)

FOREIGN PATENT DOCUMENTS

EP 0 361 357 A2 4/1990
JP 59 159885 10/1984
(Continued)

OTHER PUBLICATIONS

Combined Chinese Office Action and Search Report issued Jul. 19, 2013 in Patent Application No. 201180002306.5 with English Translation of Category of Cited Documents.
International Search Report Issued Mar. 8, 2011 in PCT/JP11/052171 Filed Feb. 2, 2011.

*Primary Examiner* — Mariceli Santiago
(74) *Attorney, Agent, or Firm* — Oblon, Spivak, McClelland, Maier & Neustadt, L.L.P.

(57) ABSTRACT

A discharge element includes a first electrode that is made of a plastically-deformable conductive material and that has an internal space and an opening communicating with the internal space, a base that is made of an insulating material and that is air-tightly joined to the opening so that the internal space of the first electrode becomes an airtight space, and a second electrode that is made of a conductive material and that is inserted into the internal space via the base so as to form a spark gap between itself and the first electrode. Therefore, it is possible to provide the discharge element that realizes a high production yield, a simple structure, and a cost reduction and a simple manufacturing method of the discharge element.

13 Claims, 10 Drawing Sheets

(56) References Cited

U.S. PATENT DOCUMENTS

| | | | |
|---|---|---|---|
| 4,658,324 A | 4/1987 | Inaba | |
| 4,739,439 A * | 4/1988 | Boy | 361/120 |
| 4,924,347 A * | 5/1990 | Cantagrel | 361/120 |
| 5,142,434 A * | 8/1992 | Boy et al. | 361/120 |
| 5,331,249 A | 7/1994 | Minamikata et al. | |
| 5,517,081 A * | 5/1996 | Mitani et al. | 361/120 |
| 5,864,208 A * | 1/1999 | McDonald | 361/120 |

FOREIGN PATENT DOCUMENTS

| | | |
|---|---|---|
| JP | 2 168588 | 6/1990 |
| JP | 6 68949 | 3/1994 |
| JP | 9 171881 | 6/1997 |
| JP | 2002 260813 | 9/2002 |
| JP | 2005-18996 A | 1/2005 |

* cited by examiner

DISCHARGE ELEMENT AND METHOD OF MANUFACTURING THE SAME

FIELD

The present invention relates to a discharge element and a method of manufacturing the same.

BACKGROUND

In some cases, a surge current caused by lighting or the like flows in a communication device including a telephone or the like. If the surge current flows in the communication device, the communication device may be broken or an operation failure may occur. Therefore, a discharge element (also referred to as a surge absorber) for letting the surge current out by electric discharge is mounted on the communication device for protection from the surge current.

A gap-type discharge element that is one type of the discharge element causes a discharge current to flow through a spark gap when a surge current flows therein. Therefore, the surge current flows via the discharge element, so that it becomes possible to prevent the surge current from flowing into the communication device.

A discharge element disclosed in Patent Literature 1 as the discharge element of the above type is structured such that a substrate with a plurality of conductive thin films spaced apart by a spark gap of a predetermined size is placed inside a glass tube whose both ends are air-tightly sealed by melting. Two leads with terminals are introduced into the glass tube and the terminals are connected to the respective conductive thin films located at both ends. The inside of the glass tube is filled with a gas for adjusting the discharge voltage.

CITATION LIST

Patent Literature

Patent Literature 1: Japanese Patent Application Laid-open No. H9-171881

SUMMARY

Technical Problem

However, in the conventional gap-type discharge element, it is difficult to adjust its characteristics after an assembly-finished product is obtained. Therefore, there are problems in that it is difficult to improve the production yield and it is difficult to reduce costs because the structure remains complicated.

The present invention has been made in view of the above, and an object of the present invention is to provide a discharge element capable of realizing a high production yield and low costs with a simple structure, and to provide a method for easily manufacturing the discharge element.

Solution to Problem

To solve the problems and to attain the object, there is provided a discharge element including a first electrode that is made of a plastically-deformable conductive material and that has an internal space and an opening communicating with the internal space, a base that is made of an insulating material and that is air-tightly joined to the opening so that the internal space of the first electrode becomes an airtight space, and a second electrode that is made of a conductive material and that is inserted into the internal space via the base so as to form a spark gap between itself and the first electrode.

There is provided the discharge element according to the present invention, in which the first electrode includes a deformed portion that protrudes into the internal space toward the second electrode.

There is provided the discharge element according to the present invention, in which the first electrode has a bellows structure to adjust a size of the spark gap.

There is provided the discharge element according to the present invention, in which the internal space of the first electrode is filled with a discharge-start-voltage adjustment gas.

There is provided the discharge element according to the present invention, in which the first electrode has a gas introduction passage, one end of which communicates with the internal space and the other end of which is air-tightly sealed.

There is provided the discharge element according to the present invention, in which the second electrode has a gas instruction passage, one end of which communicates with the internal space and the other end of which is air-tightly sealed.

There is provided the discharge element according to the present invention, in which a gap is formed between the first electrode and the base, and the gap is air-tightly blocked by a joint material.

There is provided the discharge element according to the present invention, in which a gap is formed between the second electrode and the base, and the gap is air-tightly blocked by a join material.

There is provided the discharge element according to the present invention further including a discharge trigger disposed between the first electrode and the second electrode.

There is provided a discharge element manufacturing method including preparing a first electrode that is made of a plastically-deformable conductive material and that has an internal space and an opening communicating with the internal space, a base that is made of an insulating material, and a second electrode that is made of a conductive material and assembling the discharge element including air-tightly joining the base to the opening of the first electrode so that the internal space becomes an airtight space, and inserting the second electrode into the internal space via the base so as to form a spark gap between the first electrode and the second electrode.

There is provided the discharge element manufacturing method according to the present invention, further including adjusting a size of the spark gap by deforming the first electrode.

There is provided the discharge element manufacturing method according to the present invention, further including introducing and filling a discharge-start-voltage adjustment gas into the internal space of the first electrode via a gas introduction passage, and air-tightly sealing the gas introduction passage, in which the size of the spark gap is adjusted after the gas introduction passage is air-tightly sealed.

There is provided the discharge element manufacturing method according to the present invention, in which the discharge-start-voltage adjustment gas is introduced through the gas introduction passage provided in the first electrode.

There is provided the discharge element manufacturing method according to the present invention, in which the discharge-start-voltage adjustment gas is introduced through the gas introduction passage provided in the second electrode.

There is provided the discharge element manufacturing method according to the present invention, in which the discharge-start-voltage adjustment gas is introduced by using a gap between the first electrode and the base as the gas introduction passage.

There is provided the discharge element manufacturing method according to the present invention, in which the discharge-start-voltage adjustment gas is introduced by using a gap between the second electrode and the base as the gas introduction passage.

Advantageous Effects of Invention

According to the present invention, it is possible to realize a discharge element that has a high production yield and that can be manufactured by a simple method at low costs.

DESCRIPTION OF EMBODIMENTS

Exemplary embodiments of a discharge element and a manufacturing method of the discharge element of the present invention will be explained in detail below with reference to the drawings. The present invention is not limited by the embodiments. In the drawings, the same or corresponding components are appropriately denoted by the same symbols.

First Embodiment

Figure 1:
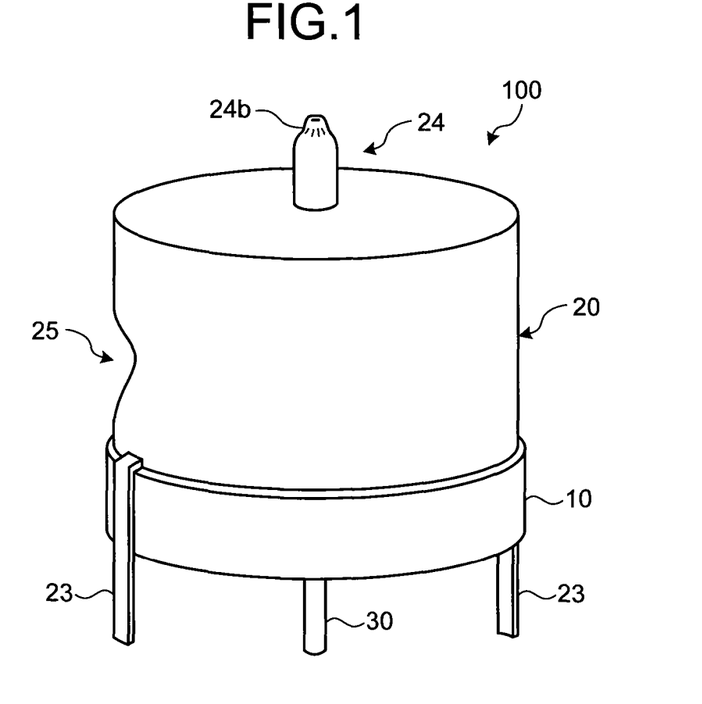
FIG. 1 is a schematic perspective view of a discharge element according to a first embodiment.
Figure 2:
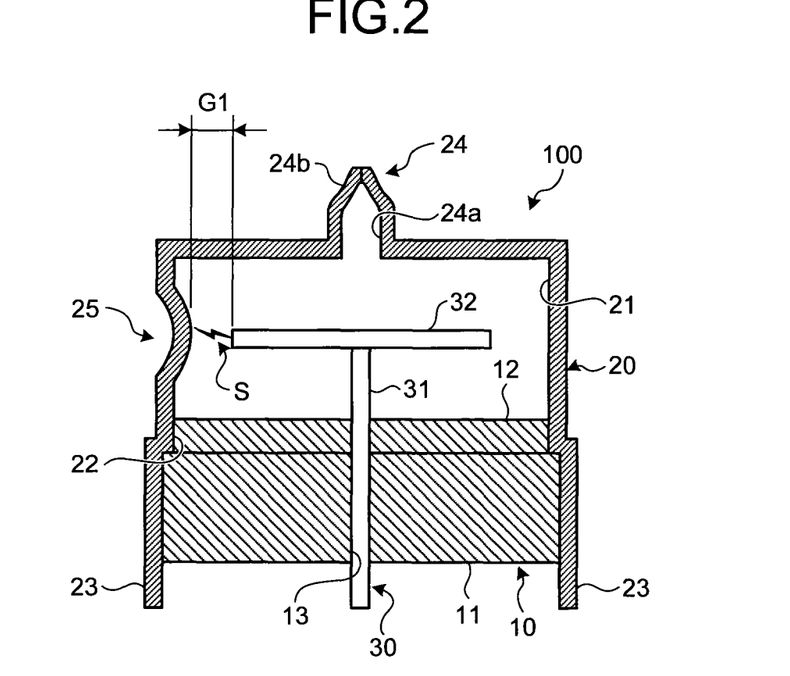
FIG. 2 is a schematic partial cross-sectional view of the discharge element illustrated in FIG. 1.

FIG. 1 is a schematic perspective view of a discharge element according to a first embodiment. FIG. 2 is a schematic partial cross-sectional view of the discharge element illustrated in FIG. 1. As illustrated in FIGS. 1 and 2, a discharge element 100 includes a base 10, a first electrode 20, and a second electrode 30.

The base 10 is formed of a cylindrical lower part 11 and a cylindrical upper part 12 that is located on the lower part 11 and that has an outer diameter slightly smaller than that of the lower part 11, and includes a hole 13 for inserting the second electrode 30. The base 10 is made of an insulating material, such as ceramics.

The first electrode 20 is made of a plastically-deformable conductive material, such as brass, and includes an internal space 21 formed in a cylindrical main body, an opening 22 communicating with the internal space 21, two terminals 23, a gas introduction part 24, and a deformed portion 25. The outer diameter of the first electrode 20 is 5 mm and the height is 6 mm for example; however, they are not limited thereto.

The upper part 12 of the base 10 is fitted to the opening 22 of the first electrode 20 and is joined by a joint material, such as a solder, a low-melting-point glass, or an adhesive agent. Therefore, the base 10 is air-tightly joined to the opening 22 so that the internal space 21 of the first electrode 20 becomes an airtight space.

The internal space 21 made to be the airtight space is filled with a discharge-start-voltage adjustment gas, such as air, argon gas, neon gas, hydrogen gas, carbon dioxide gas, carbon tetrachloride ($CCl_4$) gas, sulfur hexafluoride ($SF_6$) gas, or air, at a predetermined pressure.

The terminals 23 are provided in the lower portion of the first electrode 20, and extend to below the lower part 11 through the side surface of the lower part 11 of the base 10. The gas introduction part 24 is provided in the upper portion of the first electrode 20. The gas introduction part 24 is in the form of a tube and has a gas introduction passage 24a and a sealed portion 24b. One end of the gas introduction passage 24a communicates with the internal space 21 and the other end is air-tightly sealed by the sealed portion 24b. The sealed portion 24b is formed by, for example, crushing an end of the gas introduction part 24. The deformed portion 25 is formed by plastically deforming the side surface of the first electrode 20 so as to protrude into the internal space 21 toward the second electrode 30.

The second electrode 30 is made of a conductive material, such as copper, and includes a terminal 31 and a discharge part 32. The terminal 31 is in the form of a bar, is inserted in the internal space 21 of the first electrode 20 through the hole 13 of the base 10, and is air-tightly joined to the base 10 by a joint material. The discharge part 32 is in the form of a disk and is connected to an end of the terminal 31 on the side inserted in the internal space 21 such that the surface of the discharge part becomes approximately perpendicular to the terminal 31.

The amount of protrusion of the deformed portion 25 of the first electrode 20 in the internal space 21 is adjusted so that a spark gap G1 (see FIG. 2) between the deformed portion 25 and the discharge part 32 of the second electrode 30 falls within a predetermined range.

Usage and operations of the discharge element 100 will be explained below. The discharge element 100 in which the amount of protrusion of the deformed portion 25 is adjusted is mounted on a communication device. The discharge element 100 can easily be mounted on a substrate by inserting the terminals 23 of the first electrode 20 and the terminal 31 of the second electrode 30 into mounting holes of a predetermined circuit substrate.

When the communication device is used in a normal situation, no current flows into the discharge element 100. However, if a surge current at a predetermined voltage or greater flows into the communication device, a discharge current S flows through the spark gap G1 and the surge current flows via the discharge element 100. Therefore, the communication device can be protected from the surge current.

If a minimum voltage between the first electrode 20 and the second electrode 30 at the time the discharge current S flows through the spark gap G1 is assumed as a discharge start voltage, the discharge start voltage is determined by Paschen's law based on the type and the pressure of a discharge-start-voltage adjustment gas filled in the internal space 21 and based on the size (the gap length) of the spark gap G1.

In the discharge element 100, the deformed portion 25 can be formed by deforming the first electrode 20. Therefore, even in the discharge element 100 whose discharge start voltage is out of a predetermined range at the time of assembly, the discharge start voltage can be adjusted by adjusting the amount of protrusion of the deformed portion 25 after the assembly. Therefore, the production yield of the discharge element 100 can be improved and costs can be reduced.

Furthermore, the number of components of the discharge element 100 is small, so that costs for the components can be reduced and the manufacturing process can be simplified. Therefore, the costs can further be reduced. Moreover, the manufacturing process of the discharge element 100 need not involve a process at a high temperature of 700° C. or higher that is needed to, for example, melt glass. For example, when the base 10, the first electrode 20, and the second electrode 30 are air-tightly joined by using a solder, a low-melting-point glass, or the like, only a heating process at 400° C. or lower is needed. Therefore, the thermal stress on the discharge element 100 can be reduced to the minimum and a load on manufacturing facilities can be reduced. As a result, the discharge element 100 can be manufactured by simple and low-cost facilities. Furthermore, the frequency of a failure of the manufacturing facilities can be reduced compared with a case that a high-temperature process is needed, so that the lifetime of a facility component until replacement can be lengthened. Therefore, the manufacturing costs of the discharge element 100 can largely be reduced, so that a further cost reduction is possible. Furthermore, because a high-temperature process is not needed to manufacture the discharge element 100, the freedom of choice of the discharge-start-voltage adjustment gas can be enhanced. Therefore, it becomes possible to use, for example, $SF_6$ gas that cannot be used at a high temperature as the discharge-start-voltage adjustment gas.

Figure 3:
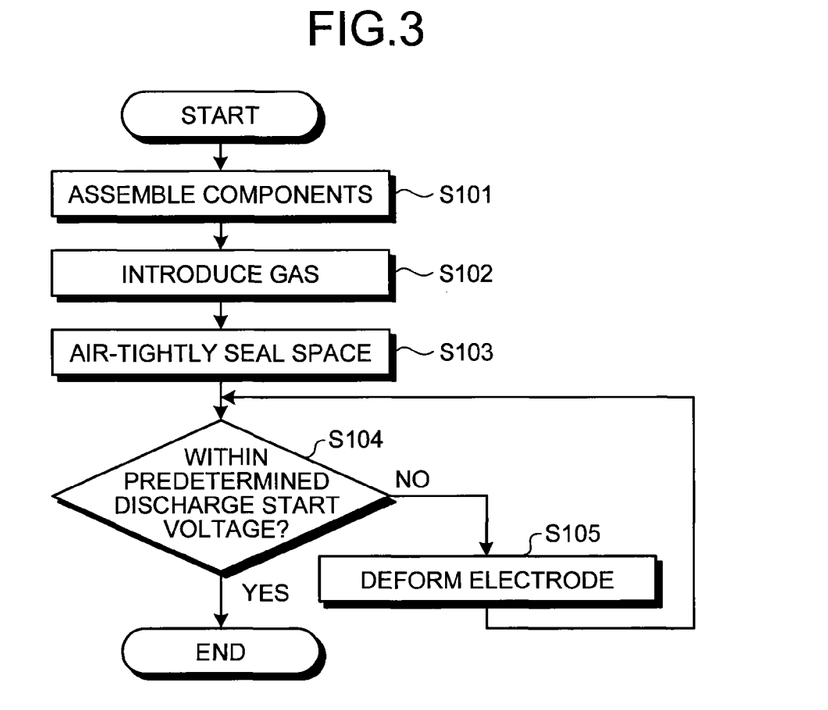
FIG. 3 is a flow diagram for explaining a manufacturing method of the discharge element illustrated in FIG. 1.

An embodiment of a manufacturing method of the discharge element 100 will be explained below. FIG. 3 is a flow diagram for explaining the manufacturing method of the discharge element 100 illustrated in FIG. 1. As illustrated in FIG. 3, in the manufacturing method, components of the discharge element 100 are firstly assembled (Step S101). Subsequently, the discharge-start-voltage adjustment gas is introduced into the internal space 21 of the discharge element 100 (Step S102). Then, the internal space 21 of the discharge element 100 is air-tightly sealed (Step S103). Subsequently, it is determined whether the discharge element 100 is within a predetermined range of a discharge start voltage (Step S104). If the discharge element 100 is not within the predetermined range of the discharge start voltage (No at Step S104), the first electrode 20 is deformed to form the deformed portion 25 (Step S105), and it is determined whether the discharge element 100 is within the predetermined range of the discharge start voltage again. If the discharge element 100 is within the predetermined range of the discharge start voltage (Yes at Step S104), the process is finished.

Figure 4:
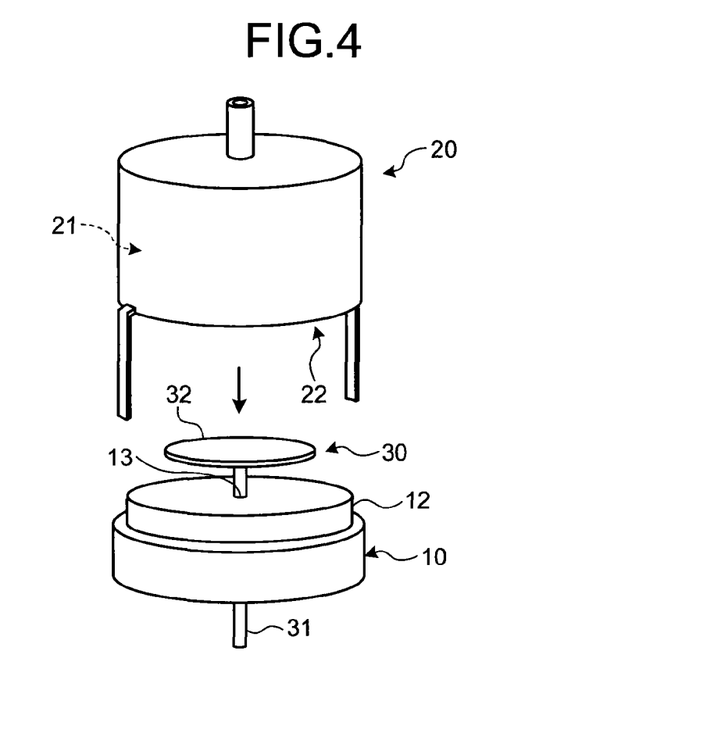
FIG. 4 is a diagram for explaining the manufacturing method illustrated in FIG. 3.
Figure 5:
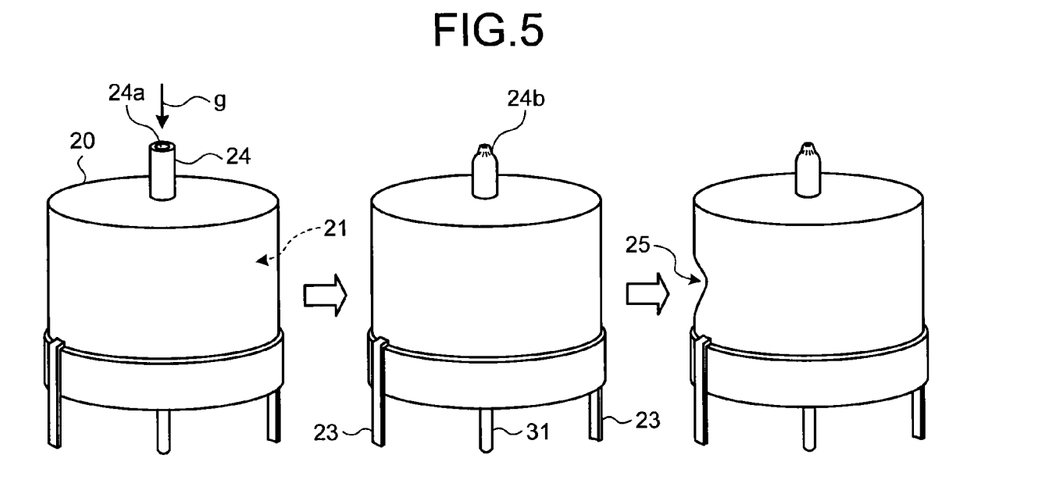
FIG. 5 is a diagram for explaining the manufacturing method illustrated in FIG. 3.

The manufacturing method will be explained in detail below. FIGS. 4 and 5 are diagrams for explaining the manufacturing method illustrated in FIG. 3.

First, as illustrated in FIG. 4, the base 10, the first electrode 20, and the second electrode 30 are assembled. At this time, the sealed portion 24b of the gas introduction part 24 and the deformed portion 25 are not formed on the first electrode 20.

The assembly may be performed by any procedure. For example, the assembly may be performed as described below. First, the terminal 31 of the second electrode 30 is inserted in the hole 13 of the base 10. At this time, the terminal is inserted so that the discharge part 32 is located on the upper part 12 side of the base 10. Subsequently, the upper part 12 of the base 10 is fitted to the opening 22 of the first electrode 20. Therefore, the discharge part 32 is housed in the internal space 21 of the first electrode 20. Subsequently, the base 10 and the first electrode 20 are air-tightly joined to each other. Similarly, the base 10 and the second electrode 30 are air-tightly joined to each other. In this case, by appropriately selecting the diameter of the discharge part 32 of the second electrode 30, the initial value of the discharge start voltage can freely be set even when the same first electrode 20 is used.

Subsequently, as illustrated in FIG. 5, a discharge-start-voltage adjustment gas g is introduced into the internal space 21 of the first electrode 20 via the gas introduction passage 24a of the gas introduction part 24. It is preferable to introduce the discharge-start-voltage adjustment gas g after the internal space 21 is turned into a low-pressure state.

Subsequently, a part of the gas introduction part 24 is crushed to form the sealed portion 24b. Therefore, the internal space 21 is air-tightly sealed while being filled with the discharge-start-voltage adjustment gas g.

Meanwhile, because the volume of the internal space 21 of the first electrode 20 is small, the internal space 21 can be turned into a vacuum state and can be filled with the discharge-start-voltage adjustment gas g, quickly and easily. Furthermore, the amount of the discharge-start-voltage adjustment gas g to be used is small and only the amount needed can be used while minimizing waste.

Subsequently, a surge current is applied between the terminals 23 of the first electrode 20 and the terminal 31 of the second electrode 30 while adjusting a voltage, and a discharge start voltage of the discharge element 100 is measured. Then, it is determined whether the measured discharge start voltage is within a predetermined range of the discharge start voltage. The predetermined range of the discharge start voltage is set as a range of the discharge start voltage that can be allowed as a product based on, for example, product specifications or the like. If the measured discharge start voltage is within the predetermined range of the discharge start voltage, the manufactured discharge element 100 is determined as a good product and the process is finished.

If the measured discharge start voltage is not within the predetermined range of the discharge start voltage, a pressure is applied to the side surface of the first electrode 20 as illustrated in FIG. 5 to plastically deform the side surface such that the side surface protrudes into the internal space 21 to form the deformed portion 25. Therefore, the gap length of a spark gap G1 between the first electrode 20 and the second electrode 30 is reduced, so that the discharge start voltage is reduced. For example, the discharge start voltage changes from 800 volts in the initial state to 400 volts due to the formation of the deformed portion 25. However, the absolute value and the amount of change of the discharge start voltage are not limited to this example.

After the deformed portion 25 is formed, the discharge start voltage is measured again to determine whether the measured discharge start voltage is within the predetermined range of the discharge start voltage. If the measured discharge start voltage is within the predetermined range of the discharge start voltage, the manufactured discharge element 100 is determined as a good product and the process is finished. If not, a pressure is further applied to the deformed portion 25 for further deformation. Therefore, the amount of protrusion of the deformed portion 25 is adjusted to be greater. At this time, it may be possible to apply a pressure to a part of the first electrode 20 other than the deformed portion 25 in order to form another deformed portion. By repeating the above process for adjusting the discharge start voltage, even the discharge element 100 whose discharge start voltage is out of the predetermined range at the time of assembly can be adjusted so that the discharge start voltage falls within the predetermined range and the discharge element 100 can be a good product. Therefore, according to the manufacturing method, it is possible to manufacture the discharge element 100 whose discharge start voltage is in a predetermined range at a high yield. Therefore, it is possible to improve the production yield.

As for the amount of protrusion of the deformed portion 25, it is preferable to experimentally or theoretically obtain a relationship between the amount of protrusion and the amount of change of the discharge start voltage in advance and to determine and adjust the amount of protrusion of the deformed portion 25 based on the relationship. However, it is well known that the internal pressure changes along with deformation of the inside of the first electrode 20 and the discharge start voltage also changes accordingly. Therefore, it is preferable to determine and adjust the amount of protrusion by taking a change in the internal pressure into consideration.

Second Embodiment

Figure 6:
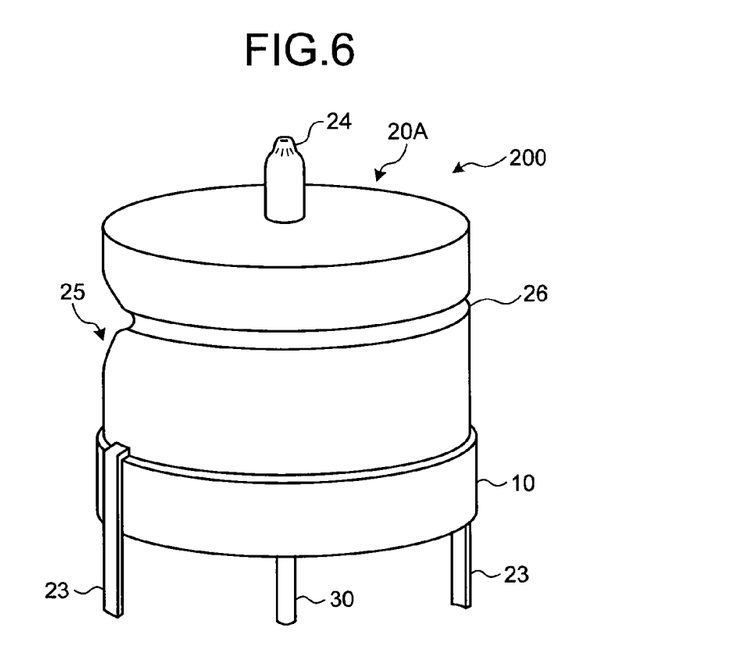
FIG. 6 is a schematic perspective view of a discharge element according to a second embodiment.
Figure 7:
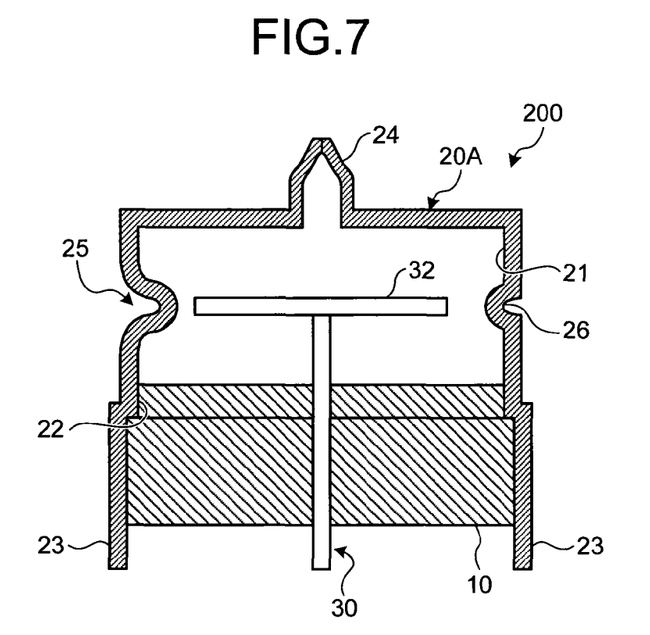
FIG. 7 is a schematic partial cross-sectional view of the discharge element illustrated in FIG. 6.

FIG. 6 is a schematic perspective view of a discharge element according to a second embodiment of the present invention. FIG. 7 is a schematic partial cross-sectional view of the discharge element illustrated in FIG. 6. As illustrated in FIGS. 6 and 7, a discharge element 200 includes the base 10, a first electrode 20A, and the second electrode 30. The base 10 and the second electrode 30 are the same as the corresponding components of the discharge element 100 of the first embodiment. Therefore, the first electrode 20A will be explained in detail below.

Similarly to the first electrode 20 of the discharge element 100, the first electrode 20A is made of a plastically-deformable conductive material, such as brass, and includes the internal space 21 formed in a cylindrical main body, the opening 22 communicating with the internal space 21, the two terminals 23, and the gas introduction part 24. The first electrode 20A also includes a groove 26 on a side surface thereof and the deformed portion 25 formed at the position of the groove 26. The groove 26 is formed at the same level as the discharge part 32 of the second electrode 30 along the outer periphery of the first electrode 20A. The internal space 21 is filled with the discharge-start-voltage adjustment gas.

The discharge start voltage of the discharge element 200 can be adjusted by forming the deformed portion 25 by deforming the first electrode 20A, similarly to the discharge element 100. Therefore, the production yield of the discharge element 200 can be improved and costs can be reduced.

When the discharge start voltage of the discharge element 200 is adjusted, it is possible to form the deformed portion 25 by referring to the position of the groove 26 that is formed at the same level as the discharge part 32 of the second electrode 30. Therefore, it is possible to more accurately and easily adjust the discharge start voltage. The deformed portion 25 may be formed in a part of the groove 26 or along the groove 26.

Third Embodiment

Figure 8:
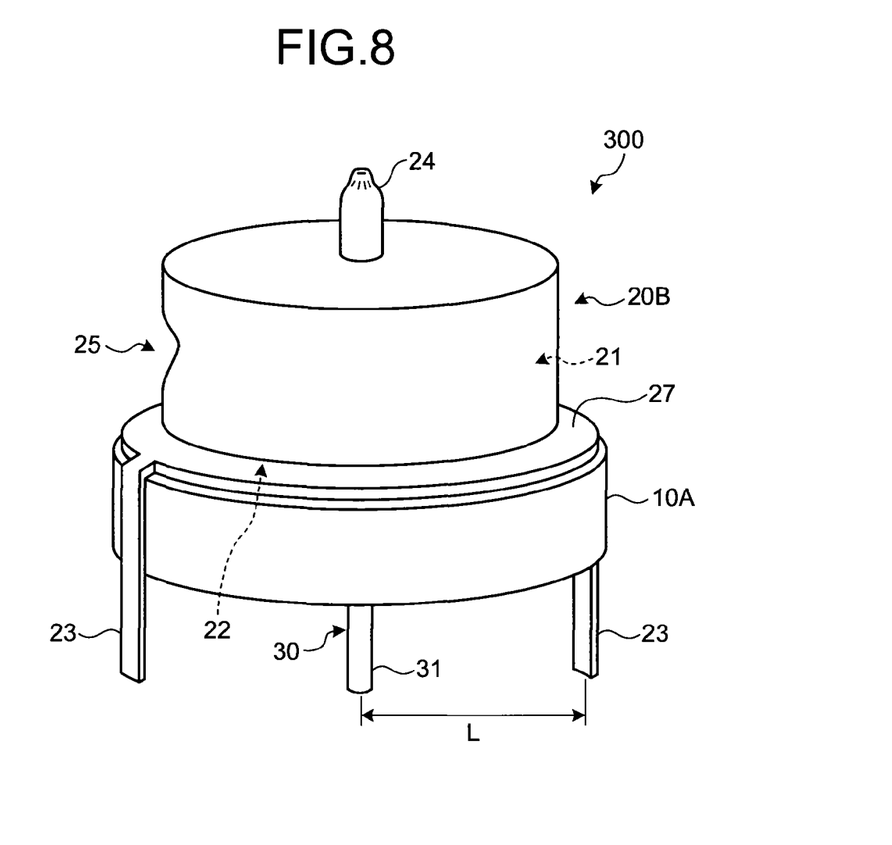
FIG. 8 is a schematic perspective view of a discharge element according to a third embodiment.

FIG. 8 is a schematic perspective view of a discharge element according to a third embodiment of the present invention. As illustrated in FIG. 8, a discharge element 300 includes a base 10A, a first electrode 20B, and the second electrode 30. The second electrode 30 is the same as the corresponding component of the discharge element 100 of the first embodiment. Therefore, the base 10A and the first electrode 20A will be explained in detail below.

The base 10A is in the form of a cylinder and has a hole (not illustrated) for inserting the second electrode 30. The base 10A is made of an insulating material, such as ceramics.

Similarly to the first electrode 20 of the discharge element 100, the first electrode 20B is made of a plastically-deformable conductive material, such as brass, and includes the internal space 21 formed in a cylindrical main body, the opening 22 communicating with the internal space 21, the two terminals 23, the gas introduction part 24, and the deformed portion 25. The first electrode 20B also includes a flange portion 27 formed in the lower portion of the main body. The outer diameter of the flange portion 27 is approximately the same as the outer diameter of the base 10A. The two terminals 23 extend downward from the flange portion 27. The first electrode 20B is placed on the base 10A and is joined to the base 10 by a joint material. Therefore, the base 10A is air-tightly joined to the opening 22 so that the internal space 21 of the first electrode 20B becomes an airtight space. The internal space 21 is filled with the discharge-start-voltage adjustment gas.

The discharge start voltage of the discharge element 300 can be adjusted by forming the deformed portion 25 by deforming the first electrode 20B, similarly to the discharge element 100. Therefore, the production yield of the discharge element 300 can be improved and costs can be reduced.

Furthermore, in the discharge element 300, the first electrode 20B has the flange portion 27 and the two terminals 23 extend downward from the flange portion 27. Therefore, if the width of the flange portion 27 is widened, the outer diameter of main body of the first electrode 20B can be reduced while the distance L between the terminals 23 of the first electrode 20B and the terminal 31 of the second electrode 30 can be maintained at a predetermined value.

In some cases, an interval between the mounting holes of the substrate mounted with the discharge element cannot be reduced to below a predetermined value in order to ensure the dielectric strength of the substrate. On the other hand, in some cases, there is a need to mount a discharge element having a small discharge start voltage on the substrate as described above. The discharge element 300 enables to set a smaller discharge start voltage by reducing the outer diameter of the main body of the first electrode 20B while maintaining the distance L between the terminals at a predetermined value or greater. Therefore, it is preferable to mount the discharge element on a substrate in which an interval between the mounting holes cannot be reduced while ensuring a creepage distance.

Fourth Embodiment

Figure 9:
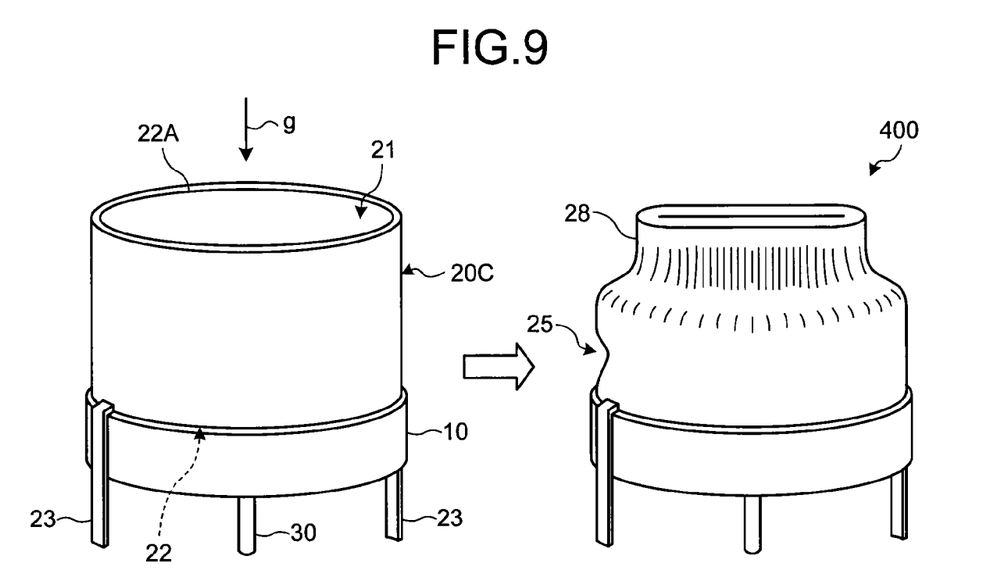
FIG. 9 is a diagram for explaining a manufacturing method of a discharge element according to a fourth embodiment.

A discharge element according to a fourth embodiment of the present invention will be explained below. In the discharge element according to the fourth embodiment, one end of a first electrode in the form of a circular tube is crushed so as to be air-tightly sealed to form an airtight space.

FIG. 9 is a diagram for explaining a manufacturing method of the discharge element according to the fourth embodiment. In the manufacturing method, similarly to the manufacturing method of the discharge element 100 as described above for example, the base 10, a first electrode 20C, and the second electrode 30 are firstly assembled. The first electrode 20C has a main body in the form of a circular tube, and includes the internal space 21 as the interior of the circular tube, the opening 22 and an opening 22A each communicating with the internal space 21, and the two terminals 23 provided in the lower part of the main body. The base 10 is fitted to the opening 22 so as to be air-tightly joined.

Subsequently, the discharge-start-voltage adjustment gas g is introduced into the internal space 21 by using the opening 22A on the upper side of the assembled first electrode 20C as a gas introduction passage. Then, the upper part of the first electrode 20C is crushed to form a sealed portion 28, so that the internal space 21 becomes an airtight space. Thereafter, it is possible to manufacture a discharge element 400 having a predetermined discharge start voltage by measuring a discharge start voltage, performing determination, and appropriately forming the deformed portion 25 similarly to the manufacturing method of the discharge element 100.

The discharge start voltage of the discharge element 400 can be adjusted by forming the deformed portion 25 by deforming the first electrode 20C, similarly to the discharge element 100. Therefore, the production yield of the discharge element 400 can be improved and costs can be reduced. Furthermore, because the discharge element 400 uses the first electrode 20C in a simple structure, costs can further be reduced.

Fifth Embodiment

Figure 10:
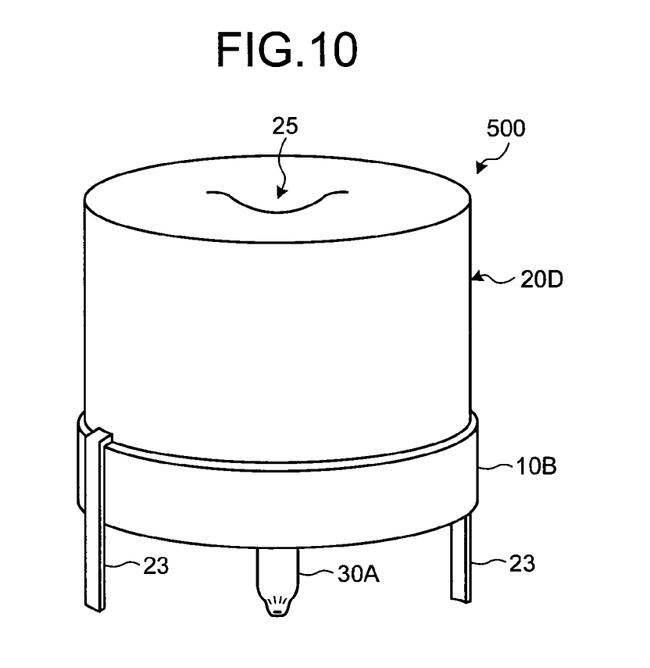
FIG. 10 is a schematic perspective view of a discharge element according to a fifth embodiment.

A discharge element according to a fifth embodiment of the present invention will be explained below. In the discharge element according to the fifth embodiment, a gas introduction part is formed on the second electrode.

Figure 11:
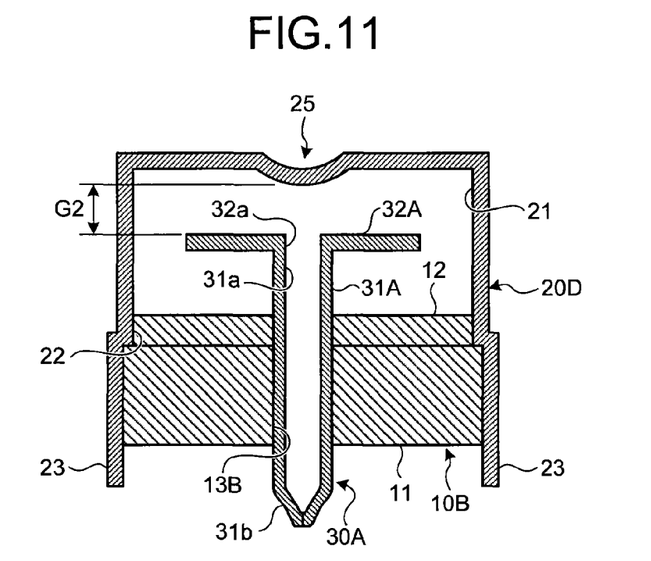
FIG. 11 is a schematic cross-sectional view of the discharge element illustrated in FIG. 10.

FIG. 10 is a schematic perspective view of the discharge element according to the fifth embodiment. FIG. 11 is a schematic partial cross-sectional view of the discharge element illustrated in FIG. 10. As illustrated in FIG. 10, a discharge element 500 includes a base 10B, a first electrode 20D, and a second electrode 30A.

The base 10B is formed of the cylindrical lower part 11 and the cylindrical upper part 12 that is located on the lower part 11 and that has an outer diameter slightly smaller than that of the lower part 11, and includes a hole 13B for inserting the second electrode 30A. The base 10B is made of an insulating material, such as ceramics.

The first electrode 20D is made of a plastically-deformable conductive material, such as brass, and includes the internal space 21 formed by a cylindrical main body, the opening 22 communicating with the internal space 21, the two terminals 23, and the deformed portion 25. The deformed portion 25 is formed by plastically deforming the top surface of the first electrode 20D so as to protrude into the internal space 21 toward the second electrode 30A. The upper part 12 of the base 10B is fitted to the opening 22 of the first electrode 20D, and is joined by a joint material. Therefore, the base 10B is air-tightly joined to the opening 22 so that the internal space 21 of the first electrode 20D becomes an airtight space. The internal space 21 is filled with the discharge-start-voltage adjustment gas.

The second electrode 30A is made of a conductive material, such as copper, and includes a terminal 31A and a discharge part 32A. The terminal 31A is inserted into the internal space 21 of the first electrode 20D via the hole 13B of the base 10B, and is air-tightly joined to the base 10B by a joint material. The terminal 31A includes a gas introduction passage 31a and a sealed portion 31b. One end of the gas introduction passage 31a communicates with the internal space 21 and the other end is air-tightly sealed by the sealed portion 31b. The sealed portion 31b is formed by, for example, crushing an end of the terminal 31A. The discharge part 32A is in the form of a disk in which an opening 32a for allowing the gas introduction passage 31a to communicate with the internal space 21 is formed in the center, and is connected to an end of the terminal 31A on the side inserted in the internal space 21 such that the flat surface of the discharge part 32A becomes approximately perpendicular to the terminal 31A.

The amount of protrusion of the deformed portion 25 of the first electrode 20D in the internal space 21 is adjusted so that a spark gap G2 (see FIG. 11) between the deformed portion 25 and the discharge part 32A of the second electrode 30A falls within a predetermined range.

In the discharge element 500, the deformed portion 25 is formed in the upper part of the first electrode 20D. Therefore, the deformed portion 25 can be formed easily. Therefore, the manufacturing process can be more simplified, so that the production yield can be improved and costs can be reduced. Furthermore, the gas introduction passage 31a for introducing the discharge-start-voltage adjustment gas into the internal space 21 of the first electrode 20D is formed on the terminal 31A of the second electrode 30A. Therefore, it is possible to provide the gas introduction passage on the discharge element 500 by a simpler structure than a structure in which the gas introduction passage is provided on the first electrode.

Figure 12:
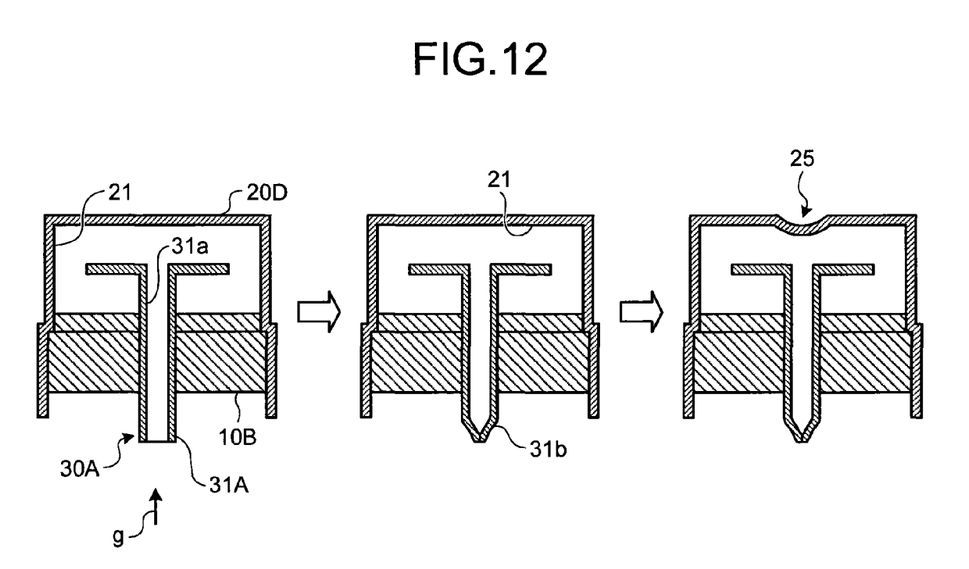
FIG. 12 is a diagram for explaining a manufacturing method of the discharge element illustrated in FIG. 10.

An embodiment of a manufacturing method of the discharge element 500 will be explained below. FIG. 12 is a diagram for explaining the manufacturing method of the discharge element illustrated in FIG. 10.

First, similarly to the manufacturing method of the discharge element 100 as described above for example, the base 10B, the first electrode 20D, and the second electrode 30A are assembled. At this time, the sealed portion 31b is not formed on the terminal 31A of the second electrode 30A and the deformed portion 25 is not formed on the first electrode 20D.

Subsequently, the discharge-start-voltage adjustment gas g is introduced into the internal space 21 of the first electrode 20D via the gas introduction passage 31a of the terminal 31A of the second electrode 30A. It is preferable to introduce the discharge-start-voltage adjustment gas g after the internal space 21 is turned into a low-pressure state.

Subsequently, an end of the terminal 31A is crushed to form the sealed portion 31b. Therefore, the internal space 21 is air-tightly sealed while being filled with the discharge-start-voltage adjustment gas g.

Then, a surge current is applied between the terminals 23 of the first electrode 20D and the terminal 31A of the second electrode 30A while adjusting a voltage, and a discharge start voltage is measured. Subsequently, it is determined whether the measured discharge start voltage is within a predetermined range of the discharge start voltage. If the measured discharge start voltage is within the predetermined range of the discharge start voltage, the manufactured discharge element 500 is determined as a good product and the process is finished. If the measured discharge start voltage is not within the predetermined range of the discharge start voltage, a pressure is applied to the top surface of the first electrode 20D to plastically deform the top surface such that the top surface protrudes into the internal space 21 to form the deformed portion 25. Therefore, the gap length of the spark gap G2 between the first electrode 20D and the second electrode 30A is reduced, so that the discharge start voltage is reduced.

After the deformed portion 25 is formed, the discharge start voltage is measured again to determine whether the measured discharge start voltage is within the predetermined range of the discharge start voltage. If the measured discharge start voltage is within the predetermined range of the discharge start voltage, the manufactured discharge element 500 is determined as a good product and the process is finished. If not, a pressure is further applied to the deformed portion 25 for further deformation. Therefore, the amount of protrusion of the deformed portion 25 is adjusted to be greater. By repeating the above process for adjusting the discharge start voltage, even the discharge element 500 whose discharge start voltage is out of the predetermined range at the time of assembly can be adjusted so that the discharge start voltage falls within the predetermined range and the discharge element can be a good product. Therefore, according to the manufacturing method, it is possible to manufacture the discharge element 500 having the discharge start voltage in a predetermined range at a high yield. Therefore, it is possible to improve the production yield. While the deformed portion 25 is formed on the top surface of the first electrode 20D of the discharge element 500, the deformed portion 25 may be formed on the side surface of the first electrode 20D.

Incidentally, it is possible to apply the above-described method, in which an electrode terminal provided with a gas introduction passage is inserted into an airtight space, a predetermined gas is introduced through the gas introduction passage, and one end of the electrode terminal is air-tightly sealed, to a case other than the manufacturing of the discharge element. Namely, the present method may be employed for manufacturing other electronic elements that are air-tightly sealed in a container filled with a predetermined gas and that have a terminal extending from the inside to the outside of the container to supply electric power to the electronic elements.

Sixth Embodiment

A discharge element according to a sixth embodiment of the present invention will be explained below. In the discharge element according to the sixth embodiment, the first electrode has a bellows structure.

Figure 13:
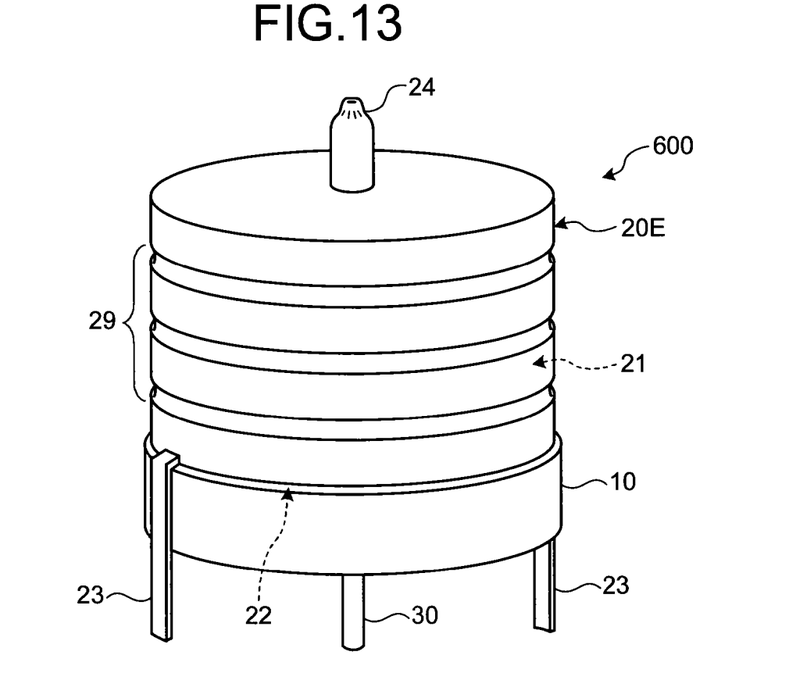
FIG. 13 is a schematic perspective view of a discharge element according to a sixth embodiment.

FIG. 13 is a schematic perspective view of the discharge element according to the sixth embodiment. As illustrated in FIG. 13, a discharge element 600 includes the base 10, a first electrode 20E, and the second electrode 30. The base 10 and the second electrode 30 are the same as the corresponding components of the discharge element 100 of the first embodiment. Therefore, the first electrode 20E will be explained in detail below.

The first electrode 20E is made of a plastically-deformable conductive material, such as brass, and includes the internal space 21 formed by a cylindrical main body that has a bellows structure 29, the opening 22 communicating with the internal space 21, the two terminals 23, and the gas introduction part 24.

Figure 14:
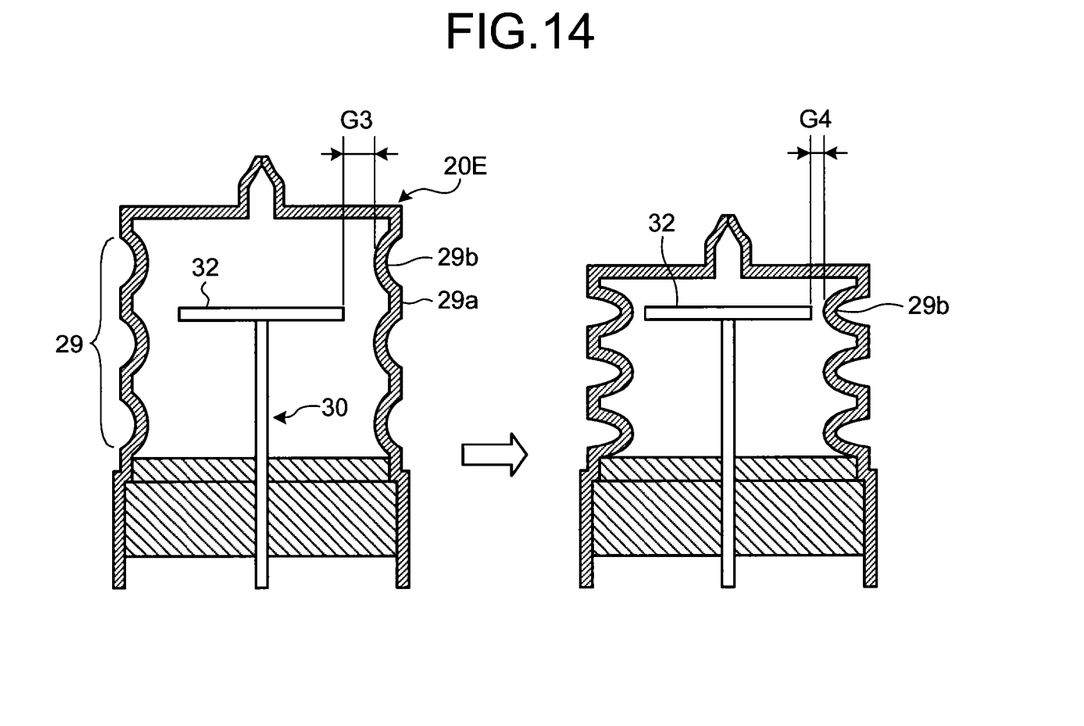
FIG. 14 is a diagram for explaining a method for adjusting a discharge start voltage of the discharge element illustrated in FIG. 13.

FIG. 14 is a diagram for explaining a method for adjusting a discharge start voltage of the discharge element illustrated in FIG. 13. As illustrated in FIG. 14, the discharge element 600 is firstly assembled such that a convex portion 29a of the bellows structure 29 of the first electrode 20E and the discharge part 32 of the second electrode 30 are located at the same level. At this time, a spark gap G3 is formed between the first electrode 20E and the second electrode 30.

To adjust the discharge start voltage of the discharge element 600, the first electrode 20E is contracted in the height direction to deform the entire first electrode 20E. In this case, the side surface of the first electrode 20E closest to the discharge part 32 relatively moves from the convex portion 29a to a concave portion 29b of the bellows structure 29. Therefore, the gap length of the spark gap between the first electrode 20E and the second electrode 30 continuously changes. Consequently, the discharge start voltage of the discharge element 600 is continuously changed and adjusted to a predetermined value. The gap length of the spark gap G4 becomes the shortest when the concave portion 29b and the discharge part 32 are at the same level as illustrated in FIG. 14.

In the discharge element 600, it is possible to continuously change the discharge start voltage to adjust the voltage to a predetermined value by a simple method of contracting the first electrode 20E in the height direction. Incidentally, it may be possible to adjust the discharge start voltage by extending the first electrode 20E in the height direction. It may also be possible to perform the first assembly so that the concave portion 29b and the discharge part 32 of the second electrode 30 are located at the same level.

Seventh Embodiment

A discharge element according to a seventh embodiment of the present invention will be explained below. The discharge element according to the seventh embodiment includes a discharge trigger.

Figure 15:
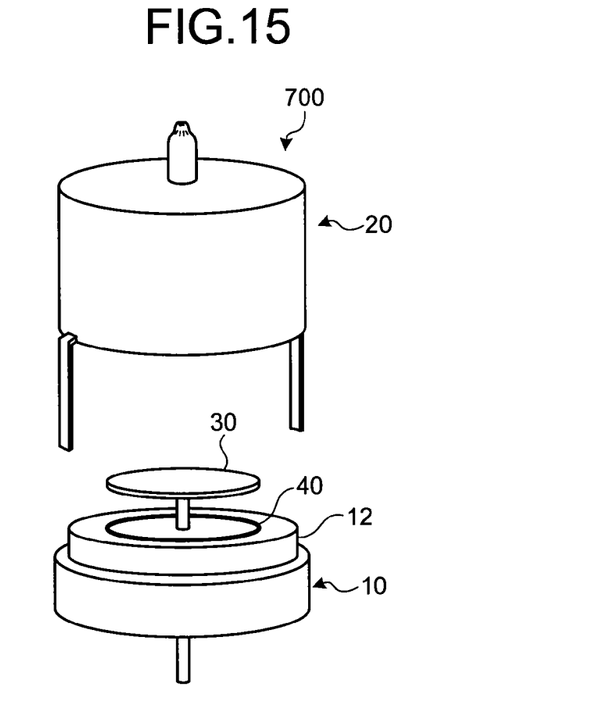
FIG. 15 is a schematic exploded perspective view of a discharge element according to a seventh embodiment.

FIG. 15 is a schematic exploded perspective view of the discharge element according to the seventh embodiment. As illustrated in FIG. 15, a discharge element 700 includes a ring-shaped discharge trigger 40 mounted on the surface of the upper part 12 of the base 10 of the discharge element 100. The discharge trigger 40 is made of a conductive material, such as carbon.

The discharge element 700 includes the discharge trigger 40 disposed between the first electrode 20 and the second electrode 30. Therefore, it is possible to shorten a response time until a discharge current flows between the first electrode 20 and the second electrode 30, so that the responsivity can be improved. The shape and the mounting position of the discharge trigger are not specifically limited as long as the response time can be shortened.

Eighth Embodiment

A discharge element according to an eighth embodiment of the present invention will be explained below. The discharge element according to the eighth embodiment has a gap between the first electrode and the base and uses the gap as a gas introduction passage.

Figure 16:
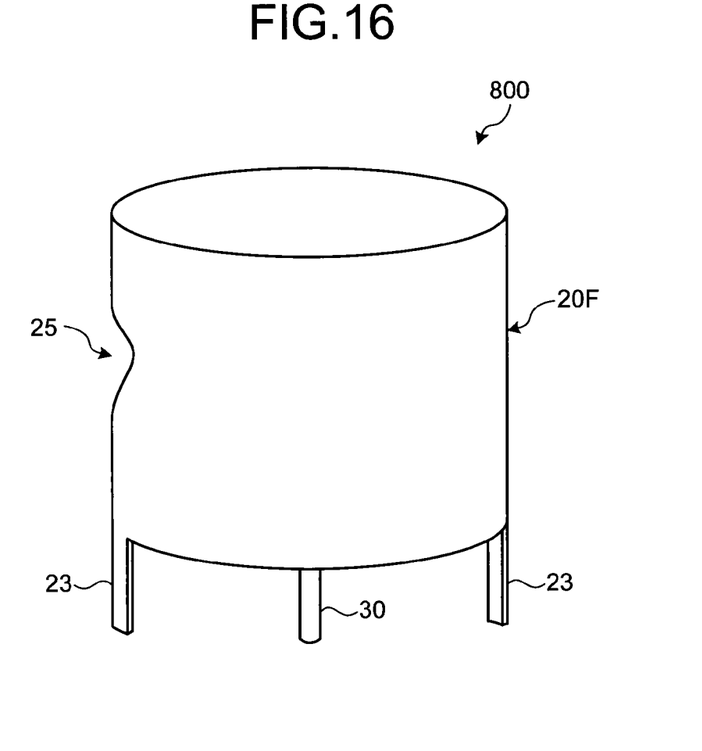
FIG. 16 is a schematic perspective view of a discharge element according to an eighth embodiment.
Figure 17:
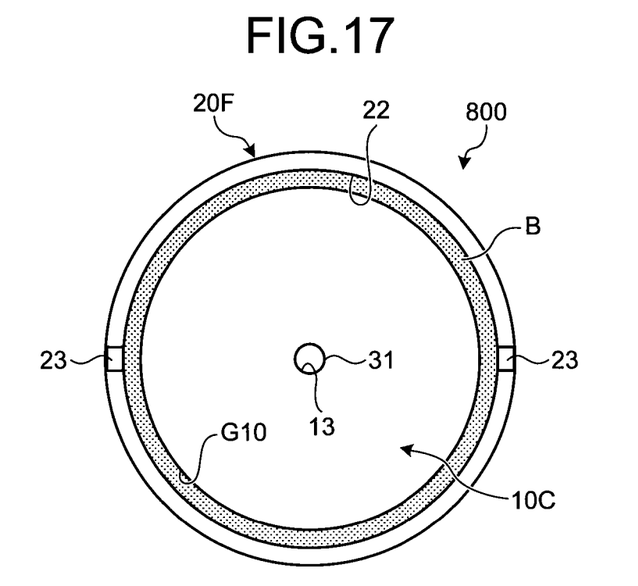
FIG. 17 is a schematic bottom view of the discharge element illustrated in FIG. 16.
Figure 18:
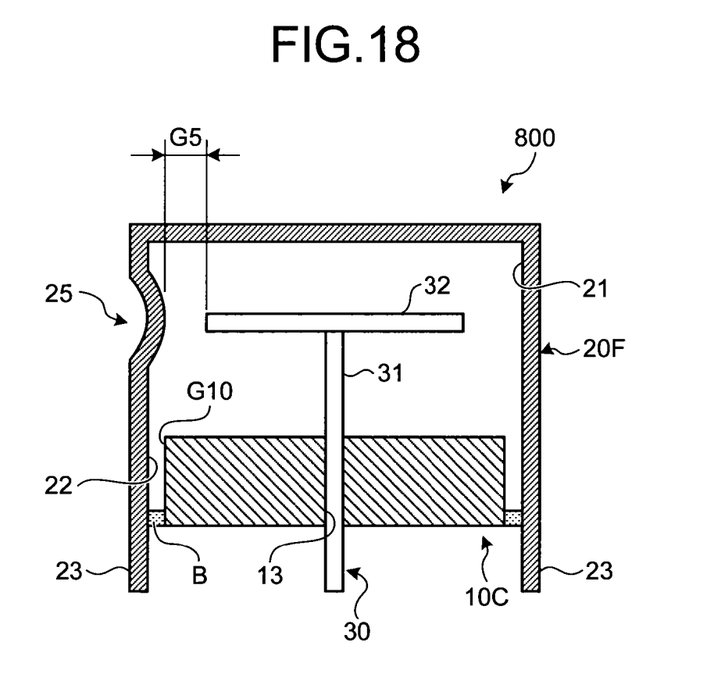
FIG. 18 is a schematic partial cross-sectional view of the discharge element illustrated in FIG. 16.

FIG. 16 is a schematic perspective view of the discharge element according to the eighth embodiment. FIG. 17 is a schematic bottom view of the discharge element illustrated in FIG. 16. FIG. 18 is a schematic partial cross-sectional view of the discharge element illustrated in FIG. 16. As illustrated in FIG. 16 to FIG. 18, a discharge element 800 includes a base 10C, a first electrode 20F, and the second electrode 30.

The base 10C is in the form of a cylinder and has the hole 13 for inserting the terminal 31 of the second electrode 30. The base 10C is made of an insulating material.

The first electrode 20F is made of a plastically-deformable conductive material, and includes the internal space 21 formed by a cylindrical main body, the opening 22 communicating with the internal space 21, the two terminals 23, and the deformed portion 25. The deformed portion 25 is formed by plastically deforming the side surface of the first electrode 20F so as to protrude into the internal space 21 toward the discharge part 32 of the second electrode 30. A spark gap G5 is formed between the first electrode 20F and the second electrode 30.

The outer diameter of the base 10C is smaller than the inner diameter of the opening 22 of the first electrode 20F. Therefore, when the base 10C is inserted in the opening 22, a gap G10 is formed between the first electrode 20F and the base 10C. The gap G10 is blocked by a joint material B. Therefore, the base 10C is air-tightly joined to the opening 22 so that the internal space 21 of the first electrode 20F becomes an airtight space. The internal space 21 is filled with the discharge-start-voltage adjustment gas.

To manufacture the discharge element 800, the base 10C is inserted into the opening 22 of the first electrode 20F, and thereafter, the discharge-start-voltage adjustment gas is introduced into the internal space 21 of the first electrode 20F by using the gap G10 as the gas introduction passage. Subsequently, the gap G10 is blocked by the joint material B so that the internal space 21 becomes an airtight space. Therefore, it is possible to easily introduce a desired discharge-start-voltage adjustment gas into the internal space 21 by using the base 10C, the first electrode 20F, and the second electrode 30 having simple structures. Thereafter, a discharge voltage is measured and the deformed portion 25 is appropriately formed to adjust the spark gap G5.

As the joint material B, a solder, a low-melting-point glass, or an adhesive agent may be used. However, the joint material is not specifically limited as long as it can air-tightly block the gap G10. While the deformed portion 25 is formed on the side surface of the first electrode 20F of the discharge element 800, the deformed portion 25 may be formed on the top surface. Furthermore, while the gap G10 is formed on the entire circumference of the base 10C of the discharge element 800, a gap with respect to the first electrode may be formed in a part of the periphery of the base so that the gap can be used as the gas introduction passage.

Figure 19:
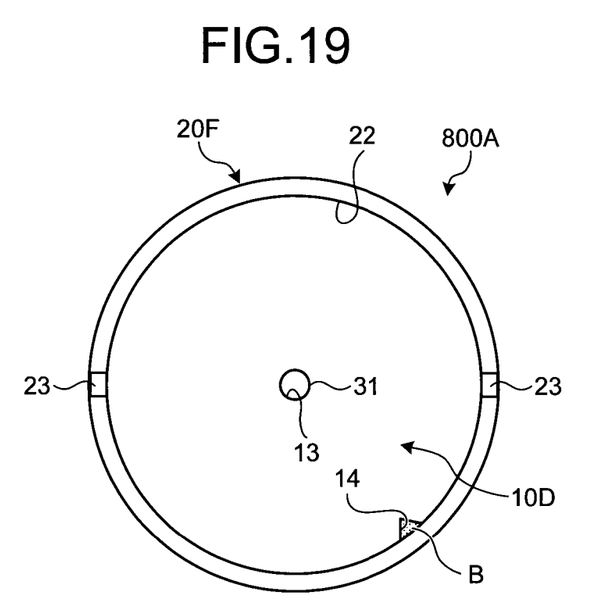
FIG. 19 is a schematic bottom view of a discharge element according to a first modification of the eighth embodiment.

FIG. 19 is a schematic bottom view of a discharge element according to a first modification of the eighth embodiment. In a discharge element 800A, the outer diameter of a base 10D is approximately the same as the inner diameter of the opening 22 of the first electrode 20F. However, a notch 14 is formed in a part of the outer periphery of the base 10D. The notch 14 communicates with the internal space 21 of the first electrode 20F but is blocked by the joint material B. The outer peripheral portion of the base 10D other than the notch 14 is air-tightly joined to the first electrode 20F. Therefore, the internal space 21 of the first electrode 20F can be maintained in the airtight state.

To manufacture the discharge element 800A, the base 10D is fitted to the opening 22 of the first electrode 20F so that the outer peripheral portion other than the notch 14 is air-tightly joined, and thereafter, a discharge-start-voltage adjustment gas is introduced into the internal space 21 of the first electrode 20F by using the notch 14 as a gas introduction passage. Subsequently, the notch 14 is blocked by the joint material B so that the internal space 21 becomes an airtight space. Therefore, it is possible to introduce a desired discharge-start-voltage adjustment gas into the internal space 21 by using the base 10D, the first electrode 20F, and the second electrode 30 having simple structures. The process for air-tightly joining the base 10D to the opening 22 of the first electrode 20F and the process for closing the notch 14 may be performed in reverse order or at the same time.

Figure 20:
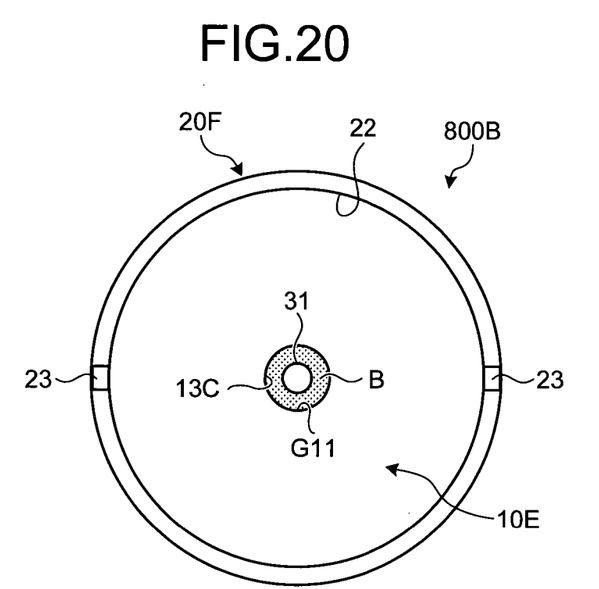
FIG. 20 is a schematic bottom view of a discharge element according to a second modification of the eighth embodiment.

FIG. 20 is a schematic bottom view of a discharge element according to a second modification of the eighth embodiment. In a discharge element 800B, the outer diameter of a base 10E is approximately the same as the inner diameter of the opening 22 of the first electrode 20F, and the base 10E and the first electrode 20F are air-tightly joined. However, the inner diameter of a hole 13c of the base 10E for inserting the terminal 32 is made greater than the outer diameter of the terminal 32 of the second electrode 30. As a result, a gap G1 is generated between the terminal 32 and the base 10E. The gap G11 is blocked by the joint material B. Therefore, the internal space 21 of the first electrode 20F can be maintained in the airtight state.

To manufacture the discharge element 800B, the base 10E is fitted to the opening 22 of the first electrode 20F so as to be air-tightly joined, and thereafter, a discharge-start-voltage adjustment gas is introduced into the internal space 21 of the first electrode 20F by using the gap G11 as a gas introduction passage. Subsequently, the gap G11 is blocked by the joint material B so that the internal space 21 becomes an airtight space. Therefore, it is possible to easily introduce a desired discharge-start-voltage adjustment gas into the internal space 21 by using the base 10E, the first electrode 20F, and the second electrode 30 having simple structures. The process for air-tightly joining the base 10E to the opening 22 of the first electrode 20F and the process for closing the gap G11 may be performed in reverse order or at the same time.

In the above embodiments, if the measured discharge start voltage is within the predetermined range after the components of the discharge element are assembled, it is not always necessary to deform the first electrode to adjust the discharge start voltage. Furthermore, the first electrode is not specifically limited as long as it is made of a plastically-deformable conductive material; therefore, various metallic materials or semiconductor materials may be used. The number of the terminals formed on the first electrode is not limited to two, and may be one or three or greater. Similarly, the number of the terminals formed on the second electrode is not limited to one, and may be two or greater.

The method for joining the first electrode and the second electrode to the base is not limited to the method using a joint material. For example, the base may be joined to the first electrode by press fitting. For another example, the second electrode may be joined to the base by press fitting. In this case, it is preferable to make the first electrode, the second electrode, and the base with a material that is flexible to a certain extent. As an electrode material, for example, tin is preferable. However, the electrode material and the shape of the electrode are not specifically limited as long as the airtight state can be ensured.

Furthermore, the present invention is not limited by the above embodiments. The present invention includes those obtained by appropriately combining the components described above. For example, the bellows structure of the sixth embodiment or the discharge trigger of the seventh embodiment may be applied to the discharge element of the other embodiments. Furthermore, other embodiments, examples, and operational techniques made by a person skilled in the art based on the above embodiments are included in the present invention.

INDUSTRIAL APPLICABILITY

As described above, the discharge element and the manufacturing method of the discharge element of the present invention are preferable as a discharge element mounted on a communication device or the like.

REFERENCE SIGNS LIST 10, 10A, 10B, 10C, 10D, 10E BASE
11 LOWER PART
12 UPPER PART
13, 13B, 13C HOLE
14 NOTCH
20, 20A, 20B, 20C, 20D, 20E, 20F FIRST ELECTRODE
21 INTERNAL SPACE
22, 22A, 32a OPENING
23, 31, 31A TERMINAL
23a, 24a, 31a GAS INTRODUCTION PASSAGE
23b, 24b, 28, 31b SEALED PORTION
24 GAS INTRODUCTION PART
25 DEFORMED PORTION
26 GROOVE
27 FLANGE PORTION
29 BELLOWS STRUCTURE
29a CONVEX PORTION
29b CONCAVE PORTION
30, 30A SECOND ELECTRODE
32, 32A DISCHARGE PART
40 DISCHARGE TRIGGER
100 to 800, 800A, 800B DISCHARGE ELEMENT
B JOINT MATERIAL
g DISCHARGE-START-VOLTAGE ADJUSTMENT GAS
G1 to G5 SPARK GAP
G10, G11 GAP
L DISTANCE
S DISCHARGE CURRENT
S101 to S104 STEP

The invention claimed is:

1. A discharge element comprising:
a first electrode that is made of a plastically-deformable conductive material and that has an internal space and an opening communicating with the internal space;
a base that is made of an insulating material and that is air-tightly joined to the opening so that the internal space of the first electrode becomes an airtight space; and
a second electrode that is made of a conductive material and that is inserted into the internal space via the base so as to form a spark gap between itself and the first electrode,
wherein the first electrode includes a deformed portion that protrudes into the internal space toward the second electrode.

2. The discharge element according to claim 1, wherein the first electrode has a bellows structure to adjust a size of the spark gap.

3. The discharge element according to claim 1, wherein the internal space of the first electrode is filled with a discharge-start-voltage adjustment gas.

4. The discharge element according to claim 1, wherein the first electrode has a gas introduction passage, one end of which communicates with the internal space and the other end of which is air-tightly sealed.

5. The discharge element according to claim 1, wherein the second electrode has a gas instruction passage, one end of which communicates with the internal space and the other end of which is air-tightly sealed.

6. The discharge element according to claim 1, wherein a gap is formed between the first electrode and the base, and the gap is air-tightly blocked by a joint material.

7. The discharge element according to claim 1, wherein a gap is formed between the second electrode and the base, and the gap is air-tightly blocked by a join material.

8. The discharge element according to claim 1, further comprising a discharge trigger disposed between the first electrode and the second electrode.

9. A discharge element manufacturing method comprising:
preparing a first electrode that is made of a plastically-deformable conductive material and that has an internal space and an opening communicating with the internal space, a base that is made of an insulating material, and a second electrode that is made of a conductive material;
assembling the discharge element, the assembling includes:
air-tightly joining the base to the opening of the first electrode so that the internal space becomes an air-tight space; and
inserting the second electrode into the internal space via the base so as to form a spark gap between the first electrode and the second electrode;
adjusting a size of the spark gap by deforming the first electrode;
introducing and filling a discharge-start-voltage adjustment gas into the internal space of the first electrode via a gas introduction passage; and
air-tightly sealing the gas introduction passage,
wherein the size of the spark gap is adjusted after the gas introduction passage is air-tightly sealed.

10. The discharge element manufacturing method according to claim 9, wherein the discharge-start-voltage adjustment gas is introduced through the gas introduction passage provided in the first electrode.

11. The discharge element manufacturing method according to claim 9, wherein the discharge-start-voltage adjustment gas is introduced through the gas introduction passage provided in the second electrode.

12. The discharge element manufacturing method according to claim 9, wherein the discharge-start-voltage adjustment gas is introduced by using a gap between the first electrode and the base as the gas introduction passage.

13. The discharge element manufacturing method according to claim 9, wherein the discharge-start-voltage adjustment gas is introduced by using a gap between the second electrode and the base as the gas introduction passage.

* * * * *